(12) United States Patent
Robertson et al.

(10) Patent No.: US 12,109,853 B2
(45) Date of Patent: Oct. 8, 2024

(54) TYRE MONITORING

(71) Applicant: AIRBUS OPERATIONS LIMITED, Bristol (GB)

(72) Inventors: Michael Robertson, Bristol (GB); Mark Andrew Johnson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 343 days.

(21) Appl. No.: 17/440,318

(22) PCT Filed: Jul. 16, 2020

(86) PCT No.: PCT/EP2020/070192
§ 371 (c)(1),
(2) Date: Sep. 17, 2021

(87) PCT Pub. No.: WO2021/018620
PCT Pub. Date: Feb. 4, 2021

(65) Prior Publication Data
US 2022/0185042 A1    Jun. 16, 2022

(30) Foreign Application Priority Data
Jul. 30, 2019 (GB) ..................................... 1910868

(51) Int. Cl.
B60C 23/04 (2006.01)
(52) U.S. Cl.
CPC ...... B60C 23/0488 (2013.01); *B60C 2200/02* (2013.01)
(58) Field of Classification Search
CPC ............ B60C 23/0488; B60C 2200/02; B60C 11/246; B60C 23/0408; B60C 23/04; B60C 23/00; B60C 23/06; B60C 23/061
See application file for complete search history.

(56) References Cited

U.S. PATENT DOCUMENTS

| 4,355,298 A | 10/1982 | Jessup |
| 6,327,904 B1 | 12/2001 | Oldenettel |
| (Continued) | | |

FOREIGN PATENT DOCUMENTS

| CA | 2189688 C | * 1/2007 | ........... B60C 11/243 |
| CN | 105984291 | 10/2016 | |
| (Continued) | | | |

OTHER PUBLICATIONS

International Search Report for PCT/EP2020/070192 mailed Sep. 14, 2020, 4 pages.

(Continued)

*Primary Examiner* — Mary Cheung
(74) *Attorney, Agent, or Firm* — Nixon & Vanderhye P.C.

(57) ABSTRACT

An apparatus for monitoring the condition of a pneumatic tyre including a pressure sensor(s) to measure an internal pressure within the tyre. A speed sensor(s) measures a rotational speed of the tyre. A controller is configured to receive data from the pressure sensor and the speed sensor and output indications related to a condition of the tyre. The controller determines the output indications by tracking the internal pressure with respect to time during use of the tyre, identifying at least one change in internal tyre pressure in a time interval. The time interval is between a first reference time and a second reference time, the reference times corresponding to points at which the speed sensor indicates different rotational speeds of the tyre. The controller further monitors the pressure change as a function of rotational speed of the tyre to provide an indicator of tyre condition.

16 Claims, 4 Drawing Sheets

(56) References Cited

U.S. PATENT DOCUMENTS

| | | | |
|---|---|---|---|
| 9,610,810 B1 | 4/2017 | Singh | |
| 9,895,941 B2 | 2/2018 | Bill | |
| 10,514,322 B2 | 12/2019 | Uhrich et al. | |
| 2003/0156023 A1* | 8/2003 | Kawasaki | B60C 23/061 340/443 |
| 2007/0113636 A1* | 5/2007 | Huang | B60C 23/06 73/146 |
| 2014/0172251 A1* | 6/2014 | Championnet | B60C 23/062 701/51 |
| 2017/0015151 A1 | 1/2017 | Bill | |

FOREIGN PATENT DOCUMENTS

| | | |
|---|---|---|
| DE | 10 2013 219 662 | 3/2015 |
| DE | 102015002599 A1 * | 9/2016 |
| DE | 10 2018 132 548 | 6/2019 |
| EP | 1970223 A1 * | 9/2008 ........... B60C 23/041 |
| EP | 3 159 189 | 4/2017 |
| FR | 2939897 | 6/2010 |
| GB | 2246461 A | 1/1992 |
| GB | 2550174 | 11/2017 |
| JP | 2012-116417 | 6/2012 |
| WO | 2018/104876 | 6/2018 |

OTHER PUBLICATIONS

Written Opinion of the ISA for PCT/EP2020/070192 mailed Sep. 14, 2020, 6 pages.
Search Report for GB1910868.7 dated Jan. 17, 2020, 4 pages.
Chinese Office Action cited in Application No. 202080024576.5 mailed Dec. 8, 2023, 6 pages.
Chinese Office Action cited in Application No. 2024062101687910 mailed Jun. 21, 2024 (7 pages).

* cited by examiner

TYRE MONITORING

RELATED APPLICATION

This application is the U.S. national phase of International Application PCT/EP2020/070192 filed Jul. 16, 2020, which designated the U.S. and claims priority to United Kingdom patent application GB 1910868.7 filed Jul. 30, 2019, the entire contents of each of which are hereby incorporated by reference.

TECHNICAL FIELD

The present invention relates to an apparatus for monitoring the condition of a pneumatic tyre and a method of monitoring wear in a pneumatic tyre. Particularly, but not exclusively, the invention relates to aircraft tyre monitoring.

BACKGROUND

Pneumatic tyres are generally formed from rubber-based compounds which wear throughout the life of the tyre. The circumferentially extending portion of the tyre which is in contact with the ground during use is the tyre tread (and may alternatively be referred to as the tyre track) and generally includes grooves to allow water to be expelled from beneath the tyre. A minimum tread thickness may be defined for safety purposes and can be measured based upon the depth of the tread in a radial direction measured for example in a groove. In an automotive application a tyre may for example initially have a tread depth of 8 mm and be required to have a minimum thread depth of 1.6 mm. The rate of tread wear is variable but may for example be expected to provide a lifespan of at least 20,000 miles. In an aircraft application a tyre may for example have an initial tread depth of 13 mm and a minimum depth requirement of 1 mm and a tyre may last 100 to 200 landings.

In both automotive and aircraft applications it will be appreciated that tyre wear must be regularly monitored. This is generally a manual process requiring a user or maintenance operative to visually inspect and/or physically measure the depth of the tyre tread. Such checks should be carried out at regular intervals but even so since many factors contribute to the rate of tyre wear it can be difficult to predict when a change may be required.

Accordingly, there is a desire to provide systems and methods for monitoring tyre wear. In particular, it would be advantageous to provide systems and methods which can monitor tyre wear without, for example, requiring any instrumentation to be embedded within the tyre carcass.

SUMMARY

A first aspect of the present invention provides an apparatus for monitoring the condition of a pneumatic tyre, the apparatus comprising: at least one pressure sensor to measure an internal pressure within the tyre; at least one speed sensor to measure a rotational speed of the tyre; and a controller that is configured to receive data from the pressure sensor and the speed sensor and output indications related to a condition of the tyre; the controller determining the output indications by: tracking the internal pressure with respect to time during use of the tyre; identifying at least one change in internal tyre pressure in a time interval between a first reference time and a second reference time, the reference times corresponding to points at which the speed sensor indicates different rotational speeds of the tyre; and monitoring the pressure change as a function of rotational speed of the tyre to provide an indicator of tyre condition, for example tyre tread condition.

The inventors have recognised that changes or fluctuations in tyre pressure can be detected during operation which can in turn be directly related to the mass of the tyre. In normal use (and excluding for example a puncture or other tyre failure) the primary change in tyre mass can be expected to be a gradual decrease in mass as the tyre tread is worn away. Further, since the mass of the tread is at the outermost circumference of the tyre, the change in mass of the tread may have a particularly notable effect on the centripetal forces when the tyre is spinning. As such (and without being restricted to any particular theory) the inventors believe that some of the detected internal pressure changes may be related to the dynamic loads on the rotating tyre. In particular, the detected pressure within the tyre may be influenced by the rotational inertia of the tyre, with the tyre expanding at high speed and causing a drop in pressure. Therefore, the pressure in the tyre may be used as an indirect indicator of tyre mass. By monitoring pressure changes as a function of tyre rotational speed it may, therefore, be possible to indirectly monitor tyre wear.

One of the first reference time or the second reference time (defining the boundaries of the time interval) may be selected to correspond to a time when the speed sensor indicates that the tyre is stationary. Thus, the pressure at one point of the interval may be a stationary tyre pressure. The other of the first reference time and second reference time may be selected to correspond to a local maximum rotational speed. In other words, when defining the time interval the controller may seek an interval in which the tyre speed sensor indicates relatively high rotational acceleration or deceleration. As such, the first and second reference times may be selected to correspond to a relatively short-duration, but relatively high-magnitude, change in rotational speed. Selection of such a time interval may maximise the difference in dynamic loads on the tyre and thus sensitivity to the influence of tyre condition on detected pressure.

In some embodiments a maximum time duration for the interval may be pre-determined. Therefore, the controller may select a first reference time at which the tyre is stationary and seek a second point by finding the point of time at which the tyre has the maximum rotational speed within the pre-determined maximum time duration (either before or after the stationary time reference). In other examples the reference time may be selected as a local maximum rotational speed based upon the rotational speed being greater than a pre-determined threshold value. For example, in the case of an automotive tyre, a reference time may correspond to a point in time when the tyre rotation speed exceeds a nominal cruise speed (for example greater than 60 mph). In the case of an aircraft tyre, a reference time may be selected based upon the tyre rotational speed being at or close to an expected speed at take-off.

The time interval between the first reference time and the second reference time may be selected to bound a sharp fluctuation in tyre pressure. For example, when tracking the internal pressure with respect to time during use of the tyre the controller may seek to identify such fluctuations and may then look up the corresponding tyre rotational speed to determine whether the time interval has a corresponding change of rotational speed.

Monitoring the pressure change as a function of rotational speed may comprise deriving a rate of change of pressure with respect to rotational speed of the tyre. For example, the pressure change per unit rotational speed may be determined. This may enable the comparison or trend monitoring of the rotation speed related pressure change (and may, for example, ensure that comparisons can be made without needing the rotational speeds to be identical). It may be appreciated that performing comparisons or trend monitoring may simplify implementations of embodiments, since the tyre condition trends may be identified from changes in the pressure change as a function of rotational speed without the need to correlate the detected changes to an actual tyre mass or tread thickness. For example, the controller may determine pressure change as a function of rotational speed each time a particular event happens (in the case of an aircraft this could be a take-off and in the case of an automobile this could be each time the vehicle stops). The change can then be compared over time to identify a trend and provide an operator with, for example, an estimate of the rate of tyre wear, or a warning that tyre wear may be greater than expected. As such, the control system may monitor the pressure change as a function of rotational speed by comparing the pressure change in a plurality of separate time intervals to identify trends in the pressure change as a function of rotational speed of the tyre.

When the pneumatic tyre is an aircraft tyre, the time interval may be after aircraft take-off. The inventors have found that a repeatably-detectable pressure fluctuation is found in this time period. It may be appreciated that at take-off the aircraft tyre is rotating at a maximum speed and becomes unloaded when the weight leaves the aircraft landing gear. Following take-off and before the landing gear is retracted it is standard practice to apply pre-retraction braking to stop the wheels rotating (for safety reasons it is generally undesirable to retract a spinning wheel). Thus, after take-off the aircraft wheel undergoes a relatively rapid deceleration. In embodiments of the invention the first reference time is after aircraft take-off when the wheels are unloaded and freely rotating. This is a local maximum wheel rotational speed. The second reference time may be when the wheels have been subjected to pre-retraction braking (and have for example fully stopped rotating).

According to a further aspect of the invention, there is provided an aircraft comprising an apparatus for monitoring the condition of a pneumatic tyre in accordance with embodiments described herein.

A further aspect of the invention comprises a method of monitoring wear in a pneumatic tyre, the method comprising:
 providing a pressure sensor to measure an internal pressure within the tyre;
 providing a speed sensor to measure a rotational speed of the tyre;
 monitoring the internal pressure with respect to time during use of the tyre;
 identifying at least one change in internal tyre pressure across a time interval in which the speed sensor indicates a change of rotational speed; and
 monitoring the pressure change as a function of rotational speed to provide an indicator of tyre condition.

In some embodiments monitoring the pressure change as a function of rotational speed may comprise identifying trends in the function over a plurality of time intervals.

The tyre may be an aircraft tyre and the time interval may be between aircraft take-off and wheel retraction.

The method may further comprise transmitting data to a networked health monitoring system. A networked health monitoring system may monitor a number of vehicles and, as such, monitoring or trend monitoring may include a comparison of a plurality of vehicles having comparable pneumatic tyres. Such accumulated data may enable additional trend identification through computational analysis of large data sets.

In a further aspect of the invention there is provided an apparatus for health-monitoring an aircraft wheel comprising a pneumatic tyre, the apparatus comprising: an internal tyre pressure sensor; a tachometer for measuring a rotational speed of the wheel; and a processor comprising: an input to receive data from the pressure sensor and tachometer; an output to send notifications related to tyre condition; and a machine-readable medium comprising instructions executable by the processor to: identify a minimum tyre pressure following aircraft take-off, when the rotational speed is at, or close to, a maximum; identify a stationary tyre pressure after said minimum, when the rotational speed indicates the wheel has stopped rotating; and derive a pressure difference, between the minimum tyre pressure and stationary tyre pressure, as a function of the rotational speed; and compare the pressure difference as a function of rotational speed over a plurality of take-off cycles to provide health monitoring of the tyre.

Whilst the invention has been described above, it extends to any inventive combination of the features set out above or in the following description or drawings.

BRIEF DESCRIPTION OF THE DRAWINGS

Embodiments of the invention will now be described, by way of example only, with reference to the accompanying drawings, in which.

DETAILED DESCRIPTION

Figure 1A:
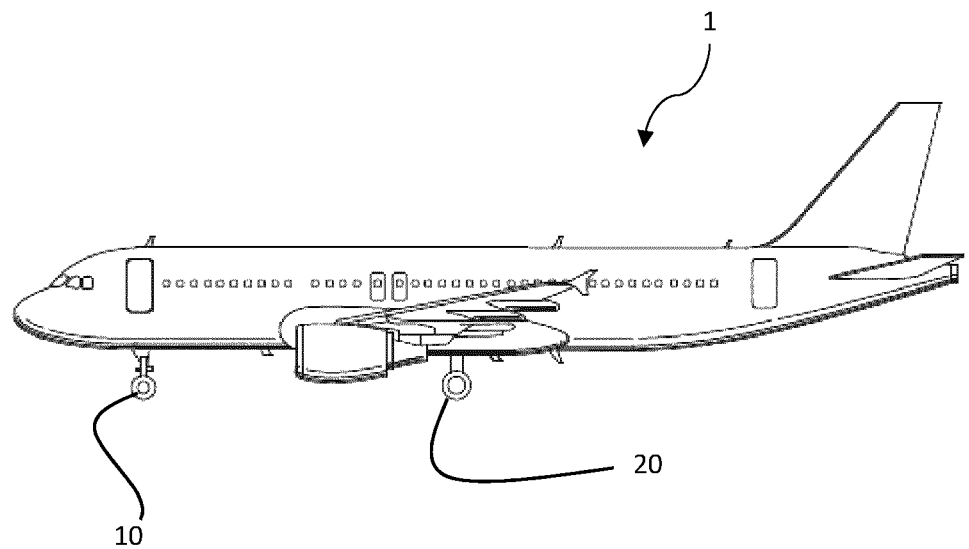
FIGS. 1a and 1b show schematic views of a commercial aircraft which may incorporate embodiments of the invention.
Figure 1B:
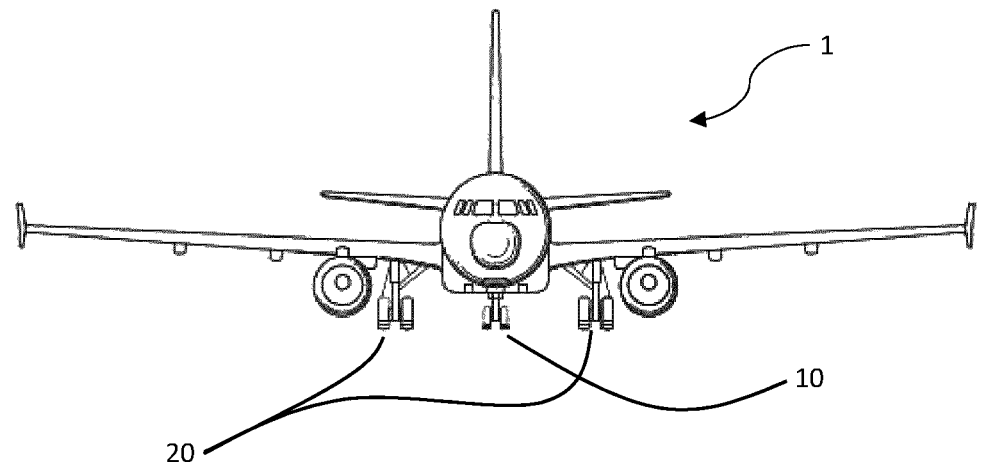
Figure 2:
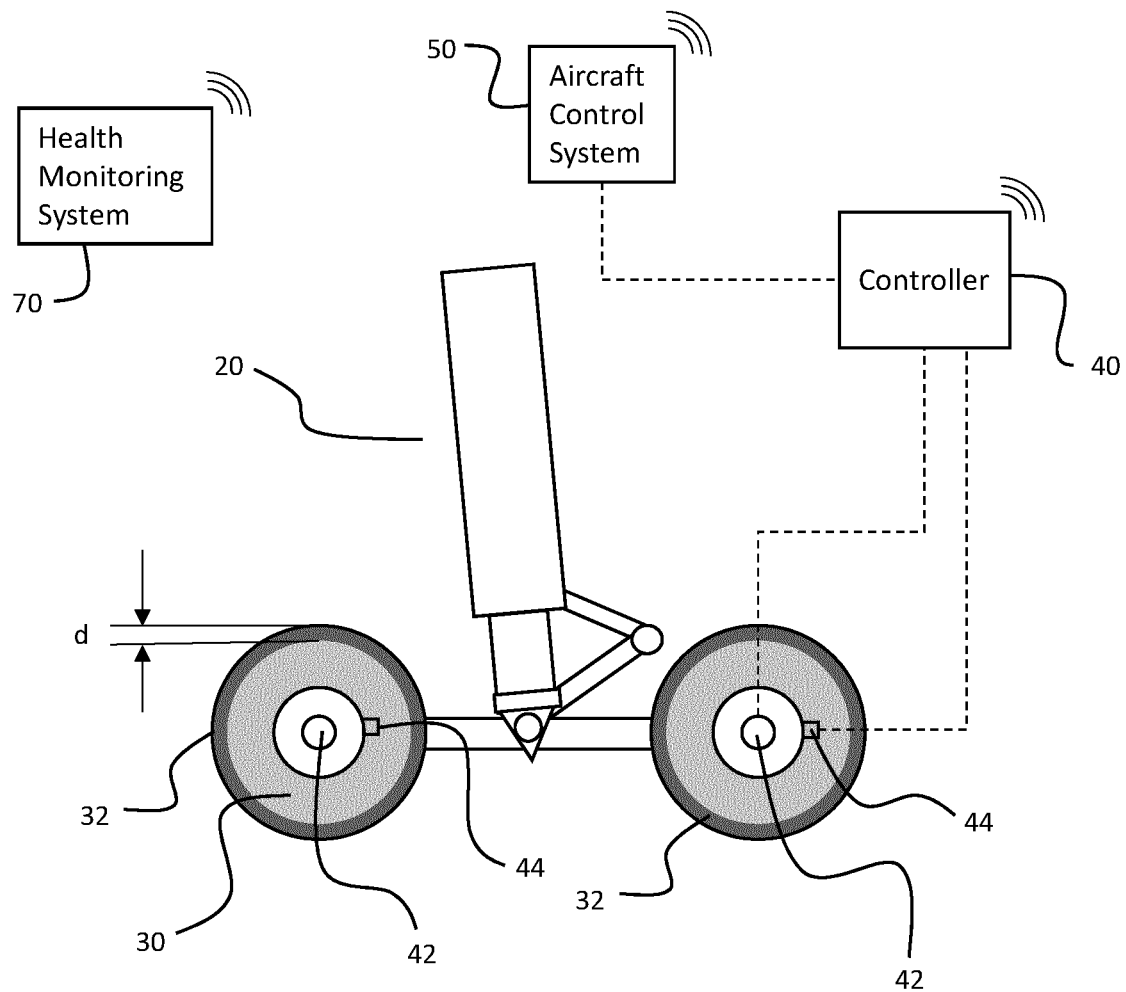
FIG. 2 shows an aircraft landing gear and a tyre monitoring apparatus in accordance with an embodiment.

A commercial aircraft 1, in this case an example of the applicant's A320 family, is shown in FIG. 1. The aircraft is provided with a nose landing gear 10 which carries a twin pair of wheels with pneumatic tyres and a pair of main landing gear 20 each having a further twin pair of wheels with pneumatic tyres. It may be appreciated that the particular configuration of wheels and landing gear will depend upon the aircraft configuration and is not limiting. For example, a main landing gear may also include multiple sets of twin wheels (as shown in the example of FIG. 2) and such arrangements are common on larger aircraft. As noted above, tyres wear in use and must be monitored and replaced at regular intervals. This incurs operating costs and can be inconvenient if a tyre requires replacement at a time or location which is not suitable for the operator. As such it would be advantageous to provide an aircraft with a tyre monitoring system which could provide ongoing, and optionally live, monitoring of tyre wear such that aircraft operators may better schedule or anticipate tyre replacement needs.

FIG. 2 shows a more detailed schematic view of an aircraft main landing gear 20 and a tyre monitoring apparatus in accordance with an embodiment. The landing gear carries wheels each having a pneumatic tyre 30. At the outer circumference of the tyre 30 is the tread 32 of the tyre, which has a tread depth "d" measured in a radial direction. Each wheel 30 may be provided with a rotational speed sensor 42. The speed sensor 42 may for example be a tachometer. One known and reliable arrangement for a tachometer is to provide an electrical generator arrangement built into the axle of the wheel. By monitoring the output of the generator, the wheel rotational speed can be determined. It may be appreciated that such tachometers may already be provided on aircraft wheels for general wheel ground speed sensing. Each wheel is also provided with a tyre pressure sensor 44 for detecting the internal pressure of the associated tyre 30. The pressure sensor 44 may be dedicated to the tyre monitoring apparatus of embodiments or may be part of a tyre pressure monitor system (which would also be used for detecting tyre punctures).

The apparatus further comprises a controller 40 which is in communication with the tyre pressure sensor 44 and tachometer 42. It will be appreciated that whilst the figure only shows the controller 40 connected to the sensor 44 and tachometer 42 of a single wheel this is merely for clarity and the same controller 40 may monitor the tyres 30 on multiple wheels.

The controller 40 of the tyre monitor apparatus may be connected to an aircraft control system 50. This may, for example, enable the controller 40 to track aircraft flight events (for example take-off, landing gear retraction) and may also enable the tyre monitoring apparatus to provide notifications to the aircraft systems (for example for the aircraft crew). It will be appreciated that in some embodiments the controller 40 may be integrated into other aircraft systems, such as the control system 50, without altering the underlying operation of the apparatus.

The controller 40 of the tyre monitor apparatus may also be in communication with a health monitoring system 70. The health monitoring system 70 may for example be a networked, or cloud-based, system. The health monitoring system 70 may connect to multiple systems and aircraft and may, for example, be used for fleet management and/or predictive maintenance. The connection to the health monitoring system 70 may be a wireless connection and may enable a live data or status feed to be sent from the controller 40. Depending upon the particular configuration of the monitoring apparatus and health monitoring system 70, it may be appreciated that the data exchanged across the network could either be raw data from the pressure sensors 42 and tachometer 44 or could be output from the tyre monitoring of the controller 40. In the case where raw data is transmitted to the health monitoring system, it may be appreciated that the control 40 of the tyre monitoring apparatus may be a centralised networked controller (for example integrated into the health monitoring system).

Figure 3:
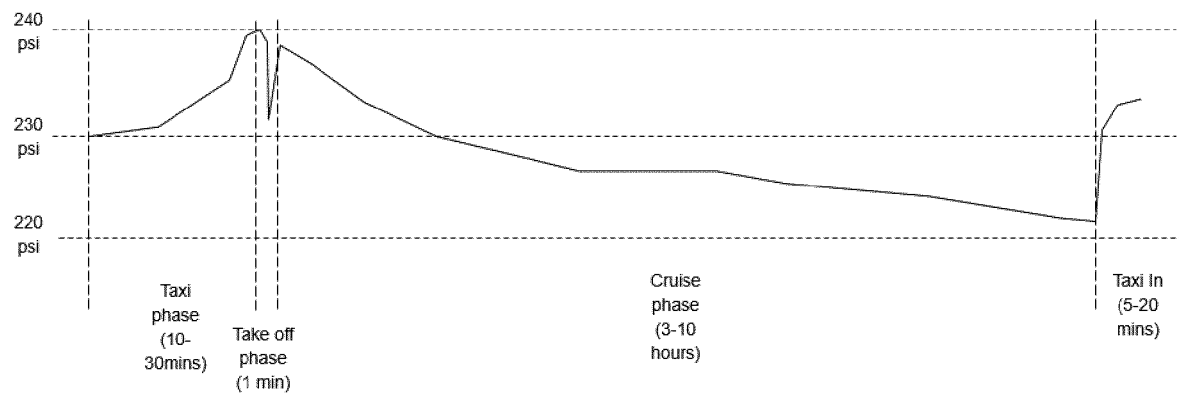
FIG. 3 shows an example plot of tyre pressure over time for a representative aircraft flight cycle.

A plot of tyre pressure versus time for an example aircraft flight cycle is shown in FIG. 3. During the initial taxi and take off stage, the tyre pressure can be seen to gradually increase (the tyres are supporting the load of the aircraft and will heat under movement). The increase in pressure becomes steeper for the final stages of the take-off run due to the acceleration of the aircraft. During the cruise phase of the flight the tyre pressure is gradually dropping (the wheels are not in use and are subject to low ambient temperatures and pressures). Upon landing the tyres are subjected to an almost step change in pressure as they take the weight of the aircraft and undergo braking. Within this general pattern, the inventors have now identified a small but measurable localised pressure fluctuation which occurs immediately following take-off. This change can be clearly seen in FIG. 3 (but may be somewhat exaggerated for clarity) and is within approximately 60 secs immediately following take-off. The inventors have been able to identify this same fluctuation in pressure plots for a variety of flights and aircraft.

Figure 4:
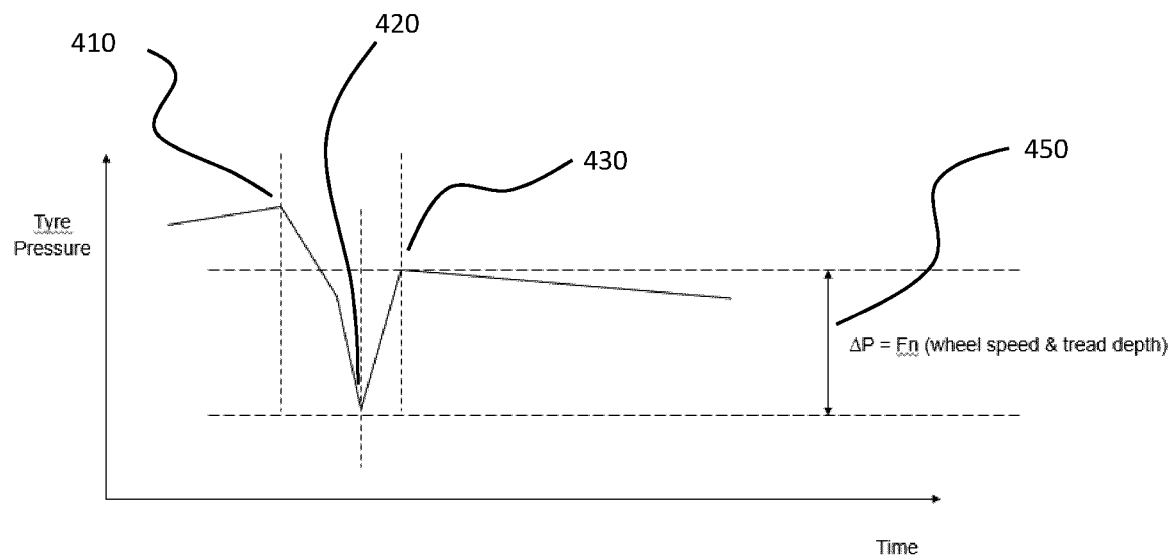
FIG. 4 shows an example of a detail of the take-off phase tyre pressure change with respect to time.

The detail of the localised pressure fluctuation is shown in FIG. 4. As would be expected, the tyre pressure is at a peak 410 during take-off roll. When the wheels leave the ground they are freely spinning at a relatively high rotational speed and a brief pressure drop to a local minimum 420 can be detected by the controller 40.

For safety reasons the wheels of at least the main landing gear 20 are braked prior to landing gear retraction. This is known as "pre-retraction" braking and is generally automatically triggered by a landing gear retraction command. The duration of the pre-retraction braking is relatively short, since it is undesirable to delay landing gear retraction. As such the wheels and tyres undergo a relatively rapid deceleration. When the tyre has been braked to a stop, the tyre pressure is found to partially recover to a second peak pressure 430. This pressure is less than the peak 410 since the tyre has been unloaded since take-off and is cooling.

The inventors have recognised that the difference between the minimum pressure 420 measured when the wheel is rotating and the subsequent maximum 430 when the tyre has been stopped is a function of the rotational speed of the tyre and the mass of the tyre. As rotational speed may be measured from the tachometer 42, it is possible for the controller 40 to quantify the change in pressure per unit of rotational speed. This removes the speed variable such that the function can be considered a direct indicator of the mass of the tyre. Variations in the mass of the tyre are primarily a result of tyre wear and tracking the change in mass (via the pressure change) can therefore be used as an indirect means of monitoring the tyre wear.

It may be appreciated that it is generally not necessary for the controller 40 to seek to calculate or derive the mass of the tyre 30 in order to implement the invention. Rather, the controller can seek to monitor general trends or changes in the pressure change as a function of tyre rotational speed (i.e. the change per unit rotation speed) detected at each take-off. The controller 40 may, for example, have access to historical data for a specific aircraft and tyre configuration to allow comparisons. The controller 40 may additionally or alternatively be provided with pre-determined threshold values, which have been identified as corresponding to certain tyre wear states (for example, partially worn, replacement required, etc). Such pre-determined threshold values could be defined empirically or theoretically or could be derived from large pressure profile data sets using an algorithm.

Figure 5:
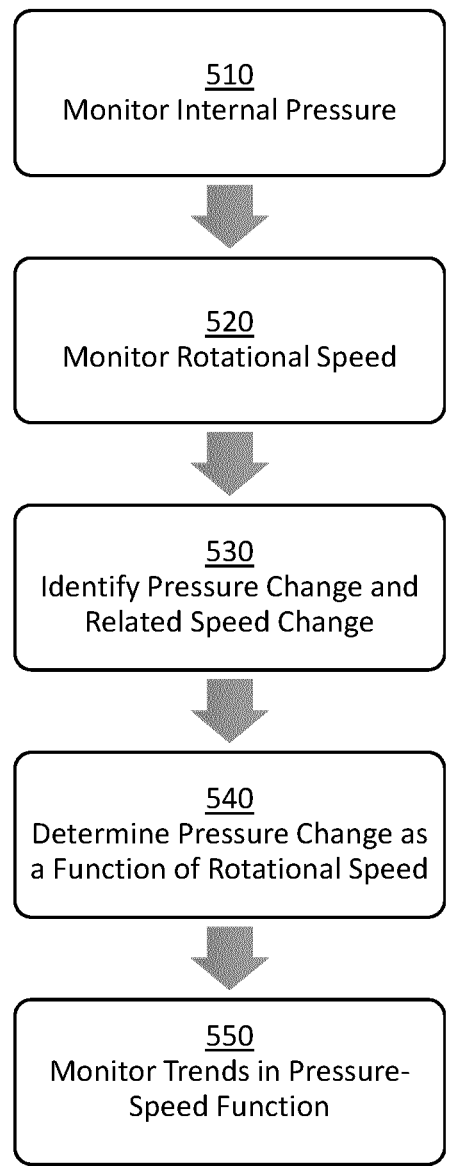
FIG. 5 illustrates the method of an embodiment of the invention.

The method of embodiments of the invention are shown in the form of a flow chart in FIG. 5. The first steps of the method comprise monitoring the internal pressure within an aircraft tyre in block 510 and monitoring the rotational speed of the tyre (or typically its associated wheel) in block 520. It may be appreciated that an advantage of embodiments of the invention is that these monitoring steps may already be carried out on the aircraft for other purposes and, as such, the invention may be implemented without the need for additional dedicated equipment or sensors.

The acquired speed and pressure data can be tracked with respect to time and is therefore easy to correlate. In block 530 the controller seeks to identify within the acquired data a measured pressure change which corresponds to a related change in wheel rotational speed. In the case of an aircraft, the controller may be preconfigured to identify such a change occurring between take-off and landing gear retraction. In an automotive application, the controller may be configured to dynamically search the acquired data for suitable changes, for example which occur within a suitable time interval.

Once a suitable change in pressure and rotational speed is identified, in block 540 the method comprises determining the pressure change as a function of rotational speed, for example quantifying a ΔP per rpm.

In block 550, the pressure change as a function of rotational speed is monitored, for example over multiple use cycles. This monitoring will generally include repeating the initial method steps (for example once per flight cycle or at a set time interval for an automotive application). Trends in the change of pressure as a function of rotational speed can then be used to identify the wear of the tyre. Over the life of the tyre the trends will be expected to show gradual change as the tread wears and reduces the mass of the tyre (and alters the mass distribution of the tyre). An alert or notification can be provided to an operator when threshold values are passed, which trend data suggests corresponds to a tyre requiring inspection or replacement. It will also be appreciated that, when monitoring trends, unexpected deviations may also be identified and could be flagged so that an operator can carry out additional inspection or maintenance, which may have preventative benefits.

It is to noted that the term "or" as used herein is to be interpreted to mean "and/or", unless expressly stated otherwise.

Although the invention has been described above with reference to preferred embodiments, it will be appreciated that various changes or modification may be made without departing from the scope of the invention as defined in the appended claims. For example, whilst the example above relates to an aircraft it will be appreciated that the basic principles of the invention may also be applicable to other vehicles in which it is desirable to monitor tyre wear.

For example, whilst the above example uses the pressure drop during take-off to track tyre wear it would be a matter of optimisation to adapt the invention to other vehicles by tracking pressure changes and identifying wheel rotational speed related pressure fluctuations. In some implementations the controller of the monitoring system could, for example, during normal use dynamically identify when a speed change has occurred and has a related pressure fluctuation which may be used for tyre condition monitoring. The skilled person may also appreciate that in seeking to apply the principles of this disclosure to other vehicles it would be possible for example to use historical data to identify conditions equivalent to the take-off case found for aircraft, so as to provide suitable parameters for tyre monitoring in that specific vehicle or vehicle type. It may also be noted that whilst using a stationary tyre as one of the pressure points for an aircraft is particularly convenient (due to the pre-retraction braking), for an automotive application it may be necessary to instead use a low speed condition (for example less than 10 mph).

The invention claimed is:

1. An apparatus for monitoring the condition of a pneumatic tire, the apparatus comprising:
    at least one pressure sensor configured to measure an internal pressure within the tire;
    at least one speed sensor configured to measure a rotational speed of the tire; and
    a controller configured to receive data from the at least one pressure sensor and the at least one speed sensor, and output indications related to a condition of the tire;
    wherein the controller is configured to determine the output indications by:
        tracking the internal pressure with respect to time during use of the tire;
        identifying at least one change in the internal tire pressure in a time interval between a first reference time and a second reference time, the first and second reference times corresponding to points at which the at least one speed sensor indicates different rotational speeds of the tire; and
        monitoring a pressure change in the tire as a function of rotational speed of the tire to provide an indicator of tire condition.

2. The apparatus as claimed in claim 1, wherein one of the first reference time or the second reference time is selected to correspond to a time when the at least one speed sensor indicates that the tire is stationary.

3. The apparatus as claimed in claim 2, wherein the other of the first reference time and second reference time is selected to correspond to a local maximum rotational speed of the tire.

4. The apparatus as claimed in claim 1, wherein the first and second reference times are selected to correspond to a short-duration, high-magnitude change in rotational speed of the tire.

5. The apparatus as claimed in claim 1, wherein the time interval between the first reference time and the second reference time is selected to bound a sharp fluctuation in tire pressure.

6. The apparatus as claimed in claim 1, wherein the monitoring the pressure change as a function of rotational speed comprises deriving a rate of change of pressure with respect to rotational speed of the tire.

7. The apparatus as claimed in claim 1, wherein the monitoring the pressure change as the function of rotational speed comprises comparing the pressure change in a plurality of separate time intervals to identify trends in the pressure change as the function of rotational speed of the tire.

8. The apparatus as claimed in claim 1, wherein the pneumatic tire is on an aircraft, and wherein the time interval is after take-off of the aircraft.

9. The apparatus as claimed in claim 8, wherein the first reference time is after the take-off when the tire is unloaded and freely rotating.

10. The apparatus as claimed in claim 8, wherein the second reference time is when the tire is subjected to pre-retraction braking.

11. An apparatus for health-monitoring an aircraft wheel comprising a pneumatic tire, the apparatus comprising:
    an internal tire pressure sensor;
    a tachometer configured to measure a rotational speed of the aircraft wheel; and
    a processor comprising an input configured to receive data from the internal tire pressure sensor and the tachometer;
    an output configured to send notifications related to a tire condition; and
    a machine-readable medium comprising instructions executable by the processor to cause the apparatus to:
        identify a minimum tire pressure following aircraft take-off, when the rotational speed is at, or close to, a maximum;
        identify a stationary tire pressure after said minimum, when the rotational speed indicates the wheel has stopped rotating; and derive a pressure difference, between the minimum tire pressure and stationary tire pressure, as a function of the rotational speed; and compare the pressure difference as a function of rotational speed over a plurality of take-off cycles to provide health monitoring of the tire.

12. An aircraft comprising:
a pneumatic tire;
at least one pressure sensor configured to measure an internal pressure within the pneumatic tire;
at least one speed sensor configured to measure a rotational speed of the pneumatic tire; and
a controller configured to receive data from the at least one pressure sensor and the at least one speed sensor, and output an indicator of a condition of the pneumatic tire, wherein the controller is configured to determine the output indicator by:
  tracking, using the data from the at least one pressure sensor, the internal pressure within the pneumatic pressure with respect to time during use of the pneumatic tire;
  identifying at least one change in the internal pressure during a time interval between a first reference time and a second reference time, the first and second reference times corresponding to points at which the at least one speed sensor indicates different rotational speeds of the pneumatic tire; and
  monitoring a pressure change of the internal pressure within the pneumatic tire as a function of rotational speed of pneumatic the tire to provide the indicator of the condition of the pneumatic tire.

13. A method of monitoring wear in a pneumatic tire, the method comprising:
using a pressure sensor to measure an internal pressure within the tire;
using a speed sensor to measure a rotational speed of the tire;
monitoring the internal pressure with respect to time during use of the tire;
identifying at least one change in internal tire pressure across a time interval in which the speed sensor indicates a change of the rotational speed; and
monitoring the pressure change as a function of the rotational speed to provide an indicator of tire condition.

14. The method of claim 13, wherein the monitoring the pressure change as the function of rotational speed comprises identifying trends in the function over a plurality of time intervals.

15. The method of claim 13, wherein the pneumatic tire is an aircraft tire, and wherein the time interval is between aircraft take-off and wheel retraction.

16. The method of claim 13, wherein the method further comprises transmitting data to a networked health monitoring system.

* * * * *